United States Patent
Kim et al.

(10) Patent No.: US 10,165,415 B2
(45) Date of Patent: Dec. 25, 2018

(54) METHOD AND APPARATUS FOR GEOMAGNETIC SIGNAL PROCESSING

(71) Applicant: SAMSUNG SDS CO., LTD., Seoul (KR)

(72) Inventors: Sang Su Kim, Seoul (KR); Young Wn Kwun, Seoul (KR); Jung Woo Cho, Seoul (KR); Ho Jun Lee, Seoul (KR); Young Mi Son, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/785,660

(22) Filed: Oct. 17, 2017

(65) Prior Publication Data

US 2018/0115874 A1 Apr. 26, 2018

(30) Foreign Application Priority Data

Oct. 26, 2016 (KR) .................. 10-2016-0139953

(51) Int. Cl.

| | |
|---|---|
| *H04W 24/00* | (2009.01) |
| *H04W 4/04* | (2009.01) |
| *G01C 25/00* | (2006.01) |
| *G01C 21/20* | (2006.01) |
| *G01C 21/08* | (2006.01) |
| *G01C 17/38* | (2006.01) |

(52) U.S. Cl.
CPC .............. *H04W 4/04* (2013.01); *G01C 17/38* (2013.01); *G01C 21/08* (2013.01); *G01C 21/206* (2013.01); *G01C 25/00* (2013.01)

(58) Field of Classification Search
CPC ........ G01C 21/08; G01C 21/10; G01C 21/01; G01C 21/206; G01C 21/20; G01S 5/02; G01S 5/0252; G01S 5/14; H04L 29/08657; H04L 29/08108; H04L 29/08936; H04W 4/02; H04W 64/00; H04M 1/72572
USPC ................................ 455/456.1–457
See application file for complete search history.

(56) References Cited

U.S. PATENT DOCUMENTS

| | | | |
|---|---|---|---|
| 2017/0010334 A1* | 1/2017 | Krause | G01R 33/0017 |
| 2017/0082440 A1* | 3/2017 | Ninomiya | G01C 21/206 |
| 2018/0066944 A1* | 3/2018 | Shu | G01C 21/206 |

FOREIGN PATENT DOCUMENTS

KR   10-0691148 B1   3/2007

* cited by examiner

*Primary Examiner* — Kathy W Wang-Hurst
*Assistant Examiner* — B M M Hannan
(74) *Attorney, Agent, or Firm* — Sughrue Mion, PLLC

(57) ABSTRACT

A method for performing geomagnetic signal processing using a geomagnetic signal processing apparatus is provided. The method includes obtaining a geomagnetic signal based on a geomagnetic sensor output; converting the obtained geomagnetic signal into a high frequency signal having a frequency equal to or higher than a reference frequency using a signal processing filter; extracting abnormal high frequency signal values outside a predetermined critical range from the converted high frequency signal; determining whether a sum of the extracted abnormal high frequency signal values converges into a critical range a preset time window; and correcting the geomagnetic signal based on the determining.

16 Claims, 6 Drawing Sheets

METHOD AND APPARATUS FOR GEOMAGNETIC SIGNAL PROCESSING

CROSS-REFERENCE TO RELATED APPLICATION

This application claims priority from Korean Patent Application No. 10-2016-0139953 filed on Oct. 26, 2016 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method and apparatus for geomagnetic signal processing and, more particularly, to a method and apparatus for performing indoor positioning of a terminal through geomagnetic signal processing.

2. Description of the Related Art

In order to measure a position of a mobile terminal, a technique of recognizing a pattern of a geomagnetic field and estimating a current position has been provided. That is, when a user having a mobile terminal is moving in an indoor area, a geomagnetic value of the position of the user is measured by a geomagnetic sensor provided in the mobile terminal, thereby measuring the position of the user.

However, the geomagnetic sensor causes a zero point distortion due to a geomagnetic influence of a positioning target area, and thus may output the biased data. Accordingly, a user's manual calibration process for the geomagnetic sensor is required at the time of positioning of the mobile terminal using the geomagnetic sensor. Also, in order to increase the accuracy of the positioning result using the geomagnetic sensor, a positioning result using a Wi-Fi or Bluetooth module or a positioning result using a separate positioning method such as Pedestrian Dead Reckoning (PDR) is used for verification of the positioning result using the geomagnetic sensor.

That is, since the positioning method using the geomagnetic sensor is not used independently, or a separate manual calibration process is required before the positioning, there is a problem that usability is poor.

Thus, there is a demand for a method of automatically correcting a geomagnetic signal sensed only by a geomagnetic sensor for positioning.

SUMMARY

Aspects of the present disclosure provide a method and apparatus for correcting a geomagnetic signal sensed by a geomagnetic sensor.

Specifically, aspects of the present disclosure provide a method and apparatus for determining whether an abnormal geomagnetic signal is noise or offset by applying a signal processing filter.

Aspects of the present disclosure also provide a method and an apparatus for measuring a position of a mobile terminal which senses a geomagnetic signal with high accuracy by correcting a geomagnetic signal determined as offset.

Aspects of the present disclosure also provide a signal processing apparatus having a signal processing filter designed in consideration of a velocity of a user of a mobile terminal.

According to aspect of the present invention provides a method for geomagnetic signal processing. The method comprises acquiring a geomagnetic signal sensed by a geomagnetic sensor, converting the acquired geomagnetic signal into a high frequency signal having a frequency equal to or higher than a reference frequency using a signal processing filter, extracting abnormal high frequency signal values outside a predetermined critical range from the converted high frequency signal, determining whether the sum of the extracted abnormal high frequency signal values converges into the critical range within a preset time window, correcting the acquired geomagnetic signal according to the determination result.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to the present disclosure, it is possible to provide an apparatus for automatically correcting a geomagnetic signal without manual calibration of a user of the mobile terminal.

Further, according to the present disclosure, it is possible to perform positioning using only a geomagnetic sensor without using another positioning apparatus or another positioning method.

Furthermore, according to the present disclosure, it is possible to provide a geomagnetic signal processing apparatus designed in consideration of a velocity of a user of a mobile terminal. Accordingly, the accuracy of the positioning result using the geomagnetic sensor can be improved.

The effects of the present disclosure are not limited to the above-described effects and other effects which are not described herein will become apparent to those skilled in the art from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, the present disclosure will be described in more detail with reference to the accompanying drawings.

Figure 1:
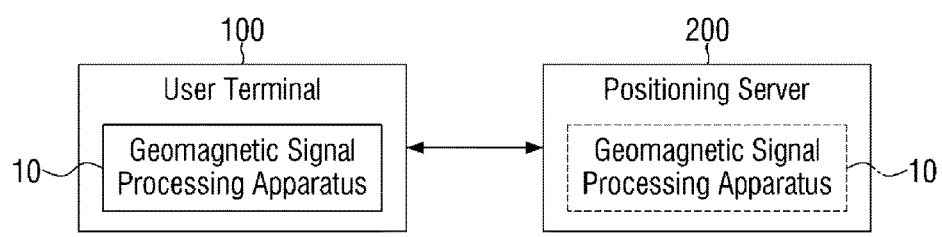
FIG. 1 shows a configuration of a positioning system using a geomagnetic signal processing apparatus according to an embodiment of the present disclosure.

FIG. 1 shows a configuration of a positioning system using a geomagnetic signal processing apparatus according to an embodiment of the present disclosure. Referring to FIG. 1, a positioning system may include a user terminal 100 and a positioning server 200.

The user terminal 100 and the positioning server 200 are computing devices capable of communicating with each other via a network.

In particular, the user terminal 100 may be any one of mobile terminals such as a smart phone, a laptop computer, a digital broadcasting terminal, a personal digital assistant (PDA), a portable multimedia player (PMP), a navigation device, a slate PC, a tablet PC, a wearable device, a smart watch, a head mounted display (HMD), a virtual reality (VR) device, and an independent device such as tag and beacon including a geomagnetic sensor.

The positioning server 200 may be any one of fixed computing devices such as a server device, a digital TV, a desktop computer, a digital signage and the like.

In particular, according to an embodiment of the present disclosure, the user terminal 100 may be configured to include a geomagnetic sensor. The user terminal 100 may be possessed by a user, and acquire a geomagnetic signal that is detected through the geomagnetic sensor while the user is moving.

In the positioning system according to the embodiment of the present disclosure, the user terminal 100 may include a geomagnetic signal processing apparatus 10. In this case, the user terminal 100 may correct the geomagnetic signal acquired by the geomagnetic sensor by using the geomagnetic signal processing apparatus 10.

In one example, the user terminal 100 may measure the position of the user terminal 100 by comparing a value of the corrected geomagnetic signal with a value of a previously stored geomagnetic signal of a positioning target area. The user terminal 100 may transmit information on the measured position of the user terminal 100 to the positioning server 200.

In another example, the user terminal 100 may correct the geomagnetic signal acquired by the geomagnetic sensor by using the geomagnetic signal processing apparatus 10, and transmit the correction result to the positioning server 200. In this case, the positioning server 200 may measure the position of the user terminal 100 by comparing the correction result with the previously stored geomagnetic signal of the positioning target area. The user terminal 100 may receive the position measurement result of the user terminal 100 from the positioning server 200.

In a positioning system according to another embodiment of the present disclosure, the positioning server 200 may include the geomagnetic signal processing apparatus 10. In this case, the positioning server 200 may correct the geomagnetic signal acquired by the geomagnetic sensor by using the geomagnetic signal processing apparatus 10.

In one example, the user terminal 100 may transmit the value of the acquired geomagnetic signal to the positioning server 200 and receive the positioning result based on the value of the geomagnetic signal corrected by the positioning server 200. In this case, the positioning server 200 may measure the position of the user terminal 100 by comparing the value of the corrected geomagnetic signal with the value of the previously stored geomagnetic signal of the positioning target area. The positioning server 200 may transmit information on the measured position of the user terminal 100 to the user terminal 100.

In another example, the user terminal 100 may transmit the value of the acquired geomagnetic signal to the positioning server 200, and receive only the correction result of the geomagnetic signal performed by the geomagnetic signal processing apparatus 10 from the positioning server 200. In this case, the user terminal 100 may measure the position of the user terminal 100 on its own based on the received correction result. That is, the user terminal 100 may measure the position of the user terminal 100 by comparing the received correction result with the previously stored geomagnetic signal of the positioning target area. The user terminal 100 may transmit information on the measured position of the user terminal 100 to the positioning server 200.

The geomagnetic signal processing apparatus 10, which may be installed in either the user terminal 100 or the positioning server 200 according to an embodiment of the present disclosure, will be described later with reference to FIGS. 3 to 11.

The positioning system may include a plurality of other user terminals as well as the user terminal 100. Further, the positioning system may include various service servers according to various uses of the present disclosure, and may be integrated with other systems.

Hereinafter, in the present specification, it is assumed that the geomagnetic signal processing apparatus 10 is provided in the user terminal 100.

Next, the detailed configuration and operation of the user terminal 100 according to another embodiment of the present disclosure will be described with reference to FIG. 2. In particular, in FIG. 2, a hardware block diagram of the user terminal 100 including the geomagnetic signal processing apparatus 10 is shown as an example.

Figure 2:
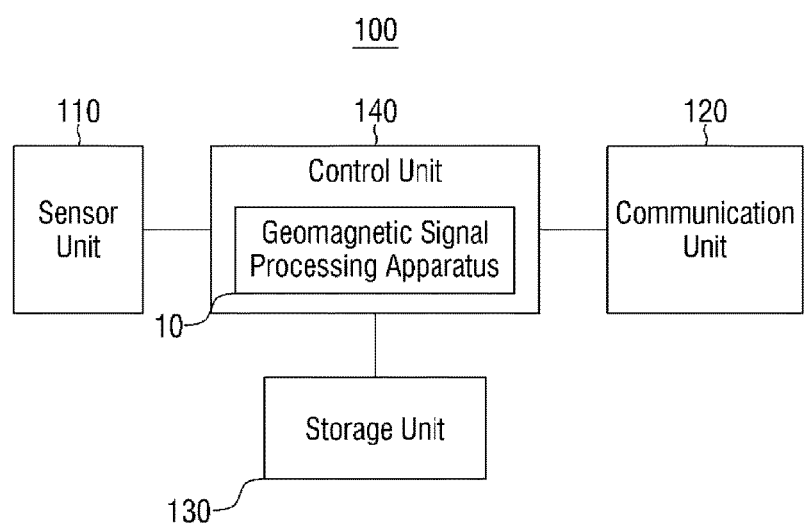
FIG. 2 is a hardware block diagram of a user terminal including a geomagnetic signal processing apparatus according to another embodiment of the present disclosure.

Referring to FIG. 2, the user terminal 100 may include a sensor unit 110, a communication unit 120, a storage unit 130 and a control unit 140.

The sensor unit 110 may sense environmental elements inside or outside the user terminal 100. To this end, the sensor unit may include various sensors such as a geomagnetic sensor, an acceleration sensor, a gyroscope, a thermal sensor and an optical sensor. In particular, the sensor unit 110 according to the embodiment of the present disclosure may include a geomagnetic sensor for sensing a geomagnetic field. The geomagnetic sensor may detect a geomagnetic value at each point in an indoor area and output the geomagnetic value.

The communication unit 120 supports wired/wireless Internet communication of the user terminal 100. Further, the communication unit 120 may support various communication schemes other than Internet communication. To this end, the communication unit 120 may be configured to include at least one communication module well known in the art.

According to the embodiment of the present disclosure, the communication unit 120 may receive the correction result of the geomagnetic signal, the positioning result for the user terminal 100 and the like from an external device, particularly, the positioning server 200. Further, the communication unit 120 may transmit the geomagnetic signal collected through the geomagnetic sensor, the correction result of the geomagnetic signal and the positioning result of the user terminal 100 to the positioning server 200.

The storage unit 130 stores various data, commands and/or information. The storage unit 130 may store one or more programs for providing a geomagnetic signal processing method according to embodiments of the present disclosure. Also, the storage unit 130 may store one or more programs for an indoor positioning method using the geomagnetic signal.

In particular, the storage unit 130 may store a geomagnetic value for each point of the positioning target area, processing values (difference, occurrence probability, frequency) using the geomagnetic value, a sequential pattern of the geomagnetic value/processing values, and the like. For example, when a department store is a positioning target area, a geomagnetic value of each area of the department store may be measured in advance. Based on the measured geomagnetic values, a geomagnetic value map may be generated. The user terminal 200 or a separate geomagnetic measurement device may be used for the geomagnetic value measurement and/or geomagnetic value map generation.

In addition, the storage unit 130 may store the settings for the size of a time window and a critical range of a high frequency signal value converted from the geomagnetic signal, and the like.

For the geomagnetic measurement for the generation of the geomagnetic value map, manual calibration for the geomagnetic sensor or verification using other positioning devices and methods is allowed in order to use an accurate geomagnetic value for each point of the positioning target area as a reference geomagnetic value for the subsequent positioning using the geomagnetic sensor.

The storage unit 130 may temporarily or non-temporarily store the data transmitted from the external device, the data input by the user, or the calculation result of the control unit 140. The storage unit 130 may be configured to include a nonvolatile memory such as a read only memory (ROM), an erasable programmable ROM (EPROM), an electrically erasable programmable ROM (EEPROM) and a flash memory, a hard disk, a removable disk, or any type of computer-readable recording medium well known in the art. Although it is illustrated in FIG. 1 that the storage unit 130 is a separate component, the storage unit 130 may be integrated with the control unit 140 to be described later and may be provided in a function execution apparatus.

The control unit 140 controls the overall operation of each component of the user terminal 100. The control unit 140 may be configured to include a Central Processing Unit (CPU), a Micro Processor Unit (MPU), a Micro Controller Unit (MCU), or any type of processor well known in the art. In addition, the control unit 140 may perform operations on at least one application or program to perform a method according to embodiments of the present disclosure.

In particular, according to the embodiment of the present disclosure, the control unit 140 may include the geomagnetic signal processing apparatus 10. The control unit 140 may control each function and operation of the geomagnetic signal processing apparatus 10. When the geomagnetic signal processing apparatus 10 includes a separate processor, the control unit 140 may limit its function in so far as the processor of the geomagnetic signal processing apparatus 10 performs the embodiment to be described with reference to FIGS. 3 to 11.

The specific operation of the geomagnetic signal processing apparatus 10 under the control of the control unit 140 or by a unique processor will be described later with reference to FIGS. 3 to 11.

Meanwhile, in the description of FIG. 2, the sensor unit 110, the communication unit 120, the storage unit 130 and the control unit 140 have been described as the components of the user terminal 100. However, according to an embodiment of the present disclosure, the user terminal 100 may be configured to include a display unit for displaying the measured position and an input unit for receiving a user's input.

Figure 3:
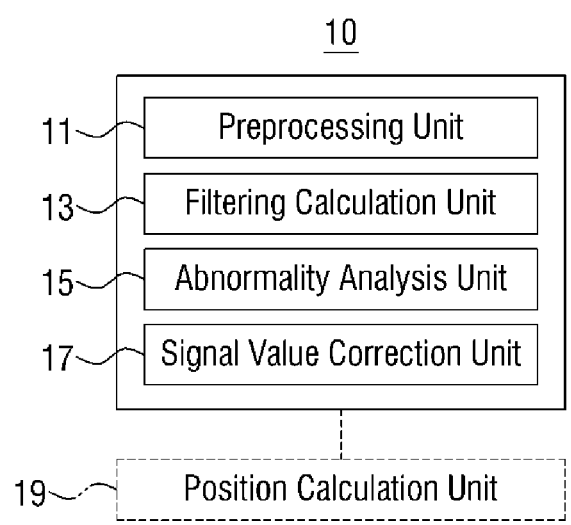
FIG. 3 is a functional block diagram of a geomagnetic signal processing apparatus according to still another embodiment of the present disclosure.

FIG. 3 is a functional block diagram of a geomagnetic signal processing apparatus according to still another embodiment of the present disclosure.

The geomagnetic signal processing apparatus 10 may include a preprocessing unit 11, a filtering calculation unit 13, an abnormality analysis unit 15 and a signal value correction unit 17. Although not shown, the geomagnetic signal processing apparatus 10 may include one or more processors for controlling the functions and operations of the components. In particular, the abnormality analysis unit 15 may serve as a control unit of the geomagnetic signal processing apparatus 10. Accordingly, the abnormality analysis unit 15 may include one or more processors and may control the functions and operations of the respective components of the geomagnetic signal processing apparatus 10.

In addition, according to the embodiment of the present disclosure, the geomagnetic signal processing apparatus 10 may further include a position calculation unit 19.

The preprocessing unit 11 may remove abnormal values of geomagnetic data and refine the data when measuring the geomagnetic value for each point of the positioning target area in advance.

The filtering calculation unit 13 may determine a critical range of a high frequency signal including only high frequency components for the geomagnetic signal obtained by measuring the geomagnetic value for each point in the positioning target area in advance. That is, the filtering calculation unit 13 may determine minimum and maximum critical values of the high frequency signal for the geomagnetic signal to be used in the geomagnetic value map. The filtering calculation unit 13 may include a signal processing filter.

The filtering calculation unit 13 may extract an abnormal signal by filtering a geomagnetic high frequency signal, which has passed through the signal processing filter and has been converted into a high frequency signal, in the determined critical range at the time of positioning using the actually acquired geomagnetic signal.

The abnormality analysis unit 15 may set a horizontally symmetric time window around the abnormal signal extracted through the filtering calculation unit 13. In addition, the abnormality analysis unit 15 may determine it as noise when the sum of the high frequency signal values in the time window is a value within the critical range, and determine it as offset when the sum is a value outside the critical range.

According to the result determined through the abnormality analysis unit 15, the signal value correction unit 17 may remove a portion corresponding to an abnormal high frequency signal value from the geomagnetic signal if an abnormal high frequency signal is noise, and correct the geomagnetic signal by measuring an offset value if it is offset.

The position calculation unit 19 may be included in the components of the geomagnetic signal processing apparatus 10 according to an embodiment of the present disclosure, but may be separately provided in any one of the user terminal 100 and the positioning server 200. The position calculation unit 19 may calculate the position of the user terminal 100 based on the corrected signal.

In FIG. 3, each of components of the geomagnetic signal processing apparatus 10 is illustrated as a block of a functional unit performed by the geomagnetic signal processing apparatus 10, but may refer to a software module executed by the control unit 140 or the processor of the geomagnetic signal processing apparatus 10. Alternatively, each of the components may refer to hardware such as a field programmable gate array (FPGA) or an application specific integrated circuit (ASIC). However, the components are not limited to software or hardware, and may be configured to reside in an addressable storage medium and configured to execute one or more processors. The functions provided in the components may be implemented by subdivided components, or implemented as a single component into which a plurality of components are combined to perform a specific function.

Figure 4:
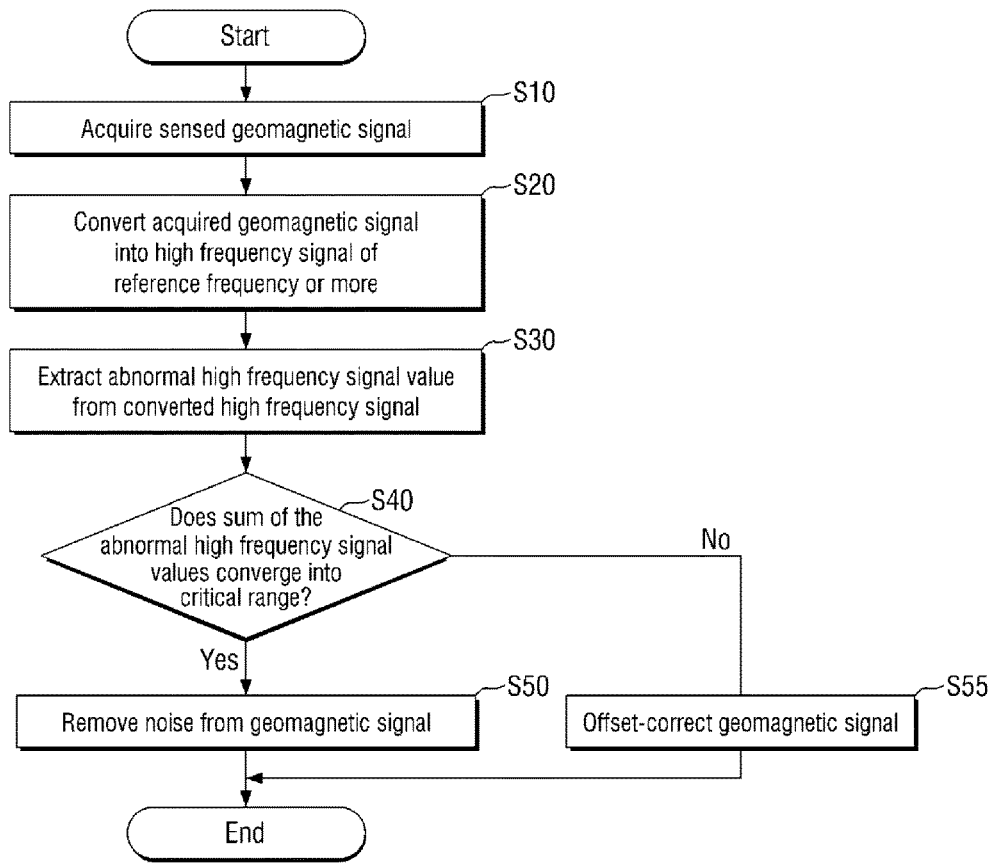
FIG. 4 is a flowchart of a geomagnetic signal processing method according to still another embodiment of the present disclosure.
Figure 5:
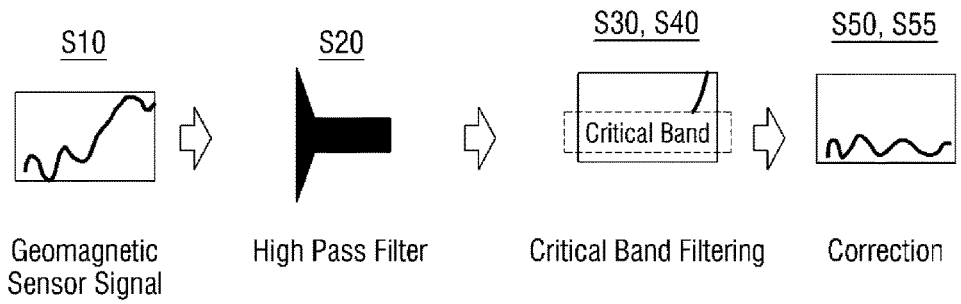
FIG. 5 is a conceptual diagram explaining the geomagnetic signal processing method of FIG. 4.

FIG. 4 is a flowchart of a geomagnetic signal processing method according to still another embodiment of the present disclosure. FIG. 5 is a conceptual diagram explaining the geomagnetic signal processing method of FIG. 4. Each of the following steps is performed by the geomagnetic signal processing apparatus 10.

Referring to FIGS. 4 and 5, the geomagnetic signal processing apparatus 10 may acquire a geomagnetic signal sensed by the geomagnetic sensor (step S10).

When the geomagnetic signal processing apparatus 10 is included in the user terminal 100, the geomagnetic signal processing apparatus 10 may receive the geomagnetic signal sensed by the sensor unit 110 of the user terminal 100.

Alternatively, when the geomagnetic signal processing apparatus 10 is included in the positioning server 200, the geomagnetic signal processing apparatus 10 may acquire the geomagnetic signal by allowing the positioning server 200 to receive the geomagnetic signal sensed by the sensor unit 110 of the user terminal 100 from the communication unit 120.

The geomagnetic signal processing apparatus 10 may convert the acquired geomagnetic signal into a high frequency signal having a frequency equal to or higher than a reference frequency by using a signal processing filter (step S20). Here, the signal processing filter may be any type of filter capable of converting a signal into a high frequency signal, such as a high pass filter and a filter using a low frequency elimination method of Inverse Fast Fourier Transform (IFFT). That is, the signal processing filter is configured to pass only a high frequency signal having a frequency equal to or higher than a cut-off frequency. As used herein, the term "cut-off frequency" may be referred to as a reference frequency. A detailed description of the signal processing filter will be given later with reference to FIG. 6.

Next, the geomagnetic signal processing apparatus 10 may extract an abnormal high frequency signal value outside a predetermined critical range from the converted high frequency signal (step S30). The critical range is a range including a maximum value and a minimum value of the high frequency signal determined by the filtering calculation unit 13. That is, the geomagnetic signal processing apparatus 10 may extract a high frequency signal value equal to or higher than the maximum value of the critical range and/or a high frequency signal value equal to or lower than the minimum value of the critical range. This process may be referred to as critical band filtering.

The geomagnetic signal processing apparatus 10 may determine whether the sum of the extracted abnormal high frequency signal values converges into a critical range within a preset time window (step S40). That is, the geomagnetic signal processing apparatus 10 may determine whether the sum of the abnormal high frequency signal values within the time window set by the abnormality analysis unit 15 converges to a predetermined value, and may determine whether the converged predetermined value is within the critical range.

A detailed description of the method of setting the time window will be described later with reference to FIGS. 9 and 10.

Next, the geomagnetic signal processing apparatus 10 may correct the acquired geomagnetic signal according to the determination result of step S40 (steps S50 and S55).

Specifically, in step S40, if the sum of the extracted abnormal high frequency signal values converges into a critical range within a preset time window, the geomagnetic signal processing apparatus 10 may determine the abnormal radio frequency signal value as noise.

If the abnormal high frequency signal value is determined as noise, the geomagnetic signal processing apparatus 10 may remove a noise region corresponding to the abnormal high frequency signal value from the acquired geomagnetic signal (step S50).

In step S40, if the sum of the extracted abnormal high frequency signal values does not converge into the critical range within a preset time window, the geomagnetic signal processing apparatus 10 may determine the abnormal high frequency signal value as offset.

If the abnormal high frequency signal value is determined as offset, the geomagnetic signal processing apparatus 10 may measure an offset value and correct the acquired geomagnetic signal based on the measured offset value (step S55).

The geomagnetic signal correction in steps S50 and S55 will be described later with reference to FIG. 11.

Figure 6:
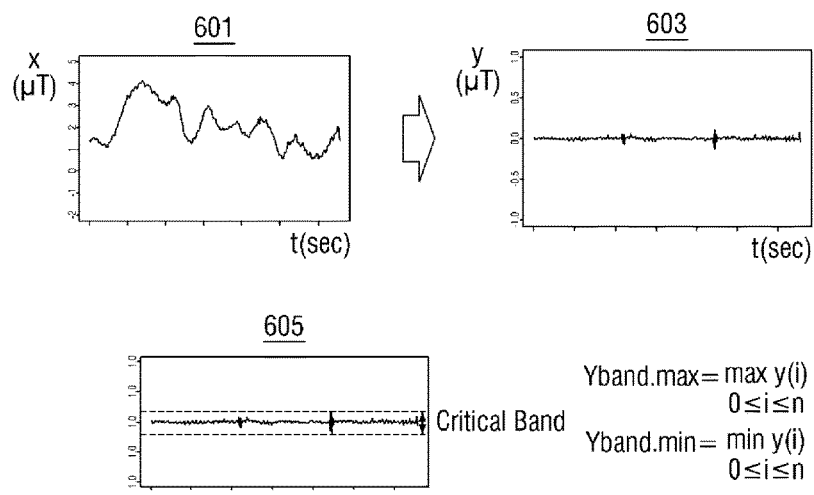
FIG. 6 is an exemplary diagram illustrating a signal processing filter according to still another embodiment of the present disclosure.

FIG. 6 is an exemplary diagram illustrating a signal processing filter according to still another embodiment of the present disclosure.

The geomagnetic signal may be a magnitude of a magnetic field, component values for three axes (x, y, z), vertical and horizontal component values obtained by rotating component values of three axes in the direction of the earth coordinate system, and the like.

Referring to FIG. 6, a signal 601 is an example of a geomagnetic signal which is sensed by the geomagnetic sensor and acquired by the geomagnetic signal processing apparatus 10. When the geomagnetic signal 601 passes through the signal processing filter, the geomagnetic signal processing apparatus 10 may generate a signal 603 including only high frequency components.

In particular, the geomagnetic signal processing apparatus 10 may generate the high frequency signal 603 by converting the previously measured geomagnetic signal 601 of the positioning target area, and then, measure a maximum high frequency value and a minimum high frequency value of the high frequency signal 603. Based on these values, the geomagnetic signal processing apparatus 10 may determine the critical range. That is, the geomagnetic signal processing apparatus 10 may generate a critical band.

The reference frequency of the signal processing filter is a frequency serving as a reference for distinguishing between a high frequency and a low frequency when the acquired geomagnetic signal is converted into a high frequency signal. Further, the reference frequency is a frequency serving as a reference for removing a fluctuation frequency due to a person's movement.

The reference frequency may be determined based on a predetermined velocity and a distance between a first point and a second point at which geomagnetic values are different from each other in the previously measured geomagnetic signal of the positioning target area.

The geomagnetic signal processing apparatus 10 may measure the geomagnetic value at each point of the positioning target area in advance, and each point has a different geomagnetic value. At this time, the distance of each point may be expressed as a distance resolution. For example, the distance resolution may be 0.5 m. That is, the points separated by a distance of 0.5 m may have different geomagnetic values.

It is assumed that a person having the user terminal 100 moves in the positioning target area at 1 m/s to 10 m/s. Since the signal processing filter needs to identify noise or offset after eliminating a frequency influence due to the movement of the person, a reference frequency fc may be determined by Eq. 1:

$$f_c = \max\left(\frac{v_{man}}{d_{loc}}\right) \quad \text{Eq. 1}$$

$v_{man}$: moving velocity of person. max 10 m/s $d_{loc}$: distance resolution for distinguish locations.

The moving velocity and the distance resolution in Eq. 1 may be set by a designer when designing the signal processing filter of the geomagnetism signal processing apparatus 10. Alternatively, they may be automatically set by the user terminal 100 and/or the positioning server 200 by analyzing the geomagnetic signal correction result of the geomagnetic signal processing apparatus 10.

The signal processing filter may be a filter to which a weight determined based on the reference frequency has been applied.

A weight α may be determined by Eq. 2:

$$\alpha = \frac{\tau}{\tau + t_s} \text{ where } \tau = \frac{1}{2\pi f_c} \quad \text{Eq. 2}$$

$\tau$: time constant $t_s$: average time difference (between 0 and n)

$f_c$: cut off frequency

In Eq. 2, $t_s$ is determined according to the resolution of the geomagnetic sensor, i.e., a sampling period. For example, in the case of a smart phone, it has a value of 0.01 msec to 0.2 msec. In this case, the weight is determined to be 0.24 or less.

When the weight is determined, the signal processing filter may be determined by Eq. 3:

$$y_i = \alpha * y_{i-1} + \alpha * (x_i - x_{i-1}), \ 0 \leq i \leq n \quad \text{Eq. 3}$$

$y_i$: Output filtered value
$y_{i-1}$: Previous Output filtered value
$x_i$: Input magnetic value
$x_{i-1}$: Previous Input magnetic value
α: weighted value (Constant)

While passing through the signal processing filter as represented by Eq. 3, the geomagnetic signal is converted into a high frequency signal having a frequency equal to or higher than the reference frequency.

In FIG. 6, a case where the signal processing filter is a high pass filter has been described as an example, but the signal processing filter according to the embodiment of the present disclosure is not limited thereto.

When the signal processing filter is a filter using a low frequency elimination method of Inverse Fast Fourier Transform (IFFT), the signal processing filter may remove low frequency components by transforming a geomagnetic signal into a frequency domain by Fast Fourier Transform (FFT), and processing low frequencies below the reference frequency to zero. Then, the signal processing filter may obtain a high frequency signal in which low frequency components have been removed by converting it into an original signal by Inverse Fast Fourier Transform (IFFT).

Figure 7:
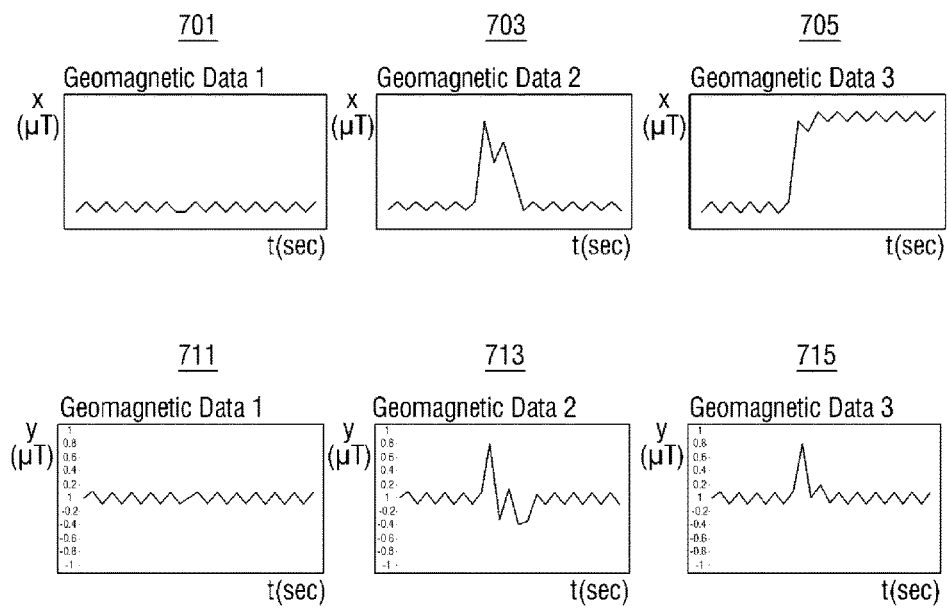
FIG. 7 illustrates signal processing results of a signal processing filter according to some embodiments of the present disclosure.

FIG. 7 illustrates signal processing results of a signal processing filter according to some embodiments of the present disclosure.

Referring to FIG. 7, a geomagnetic signal is sensed by the geomagnetic sensor for each positioning target area. Accordingly, it is assumed that the geomagnetic signal processing apparatus 10 has acquired geomagnetic data 1 (701), geomagnetic data 2 (703), and geomagnetic data 3 (705) as a geomagnetism signal.

The geomagnetic signal processing apparatus 10 may acquire a high frequency signal for the geomagnetic signal by allowing each of geomagnetic data 1 (701), geomagnetic data 2 (703) and geomagnetic data 3 (705) to pass through the signal processing filter.

For example, the geomagnetic signal processing apparatus 10 may generate a high frequency signal 711 of geomagnetic data 1, a high frequency signal 713 of geomagnetic data 2, and a high frequency signal 715 of geomagnetic data 3 as high frequency signals of the geomagnetic signal.

Referring to FIG. 7, the geomagnetic data 1 (701) may be a previously measured high frequency signal of the positioning target area and is a signal having a stable value. Accordingly, the frequency signal 711 also has a stable value.

On the other hand, the geomagnetic data 2 (703) and geomagnetic data 3 (705) have a violent fluctuation in signal values, and the signal processing filter may amplify and output a fluctuation of signal values when converting the geomagnetic signal into a high frequency signal.

Figure 8:
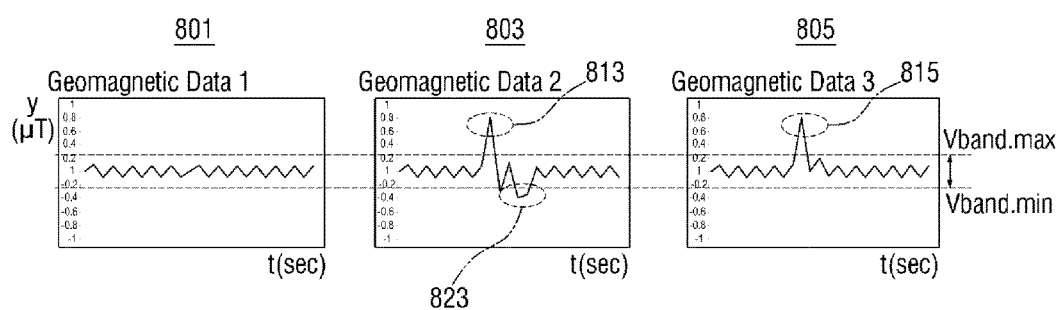
FIG. 8 is an example of an abnormal signal according to some embodiments of the present disclosure.

FIG. 8 is an example of an abnormal signal according to some embodiments of the present disclosure.

Referring to FIG. 8, the high frequency signal 801 of the geomagnetic data 1 has all signal values within the critical range and the high frequency signal 803 of the geomagnetism data 2 has abnormal high frequency signal values 813 and 815 outside the critical range.

The abnormal high frequency signal value 813 has a value larger than the maximum value of the critical range, and the abnormal high frequency signal value 823 has a value smaller than the minimum value of the critical range.

The high frequency signal 805 of the geomagnetic data 3 includes an abnormal high frequency signal value 815 outside the critical range.

The geomagnetic signal processing apparatus 10 may extract the abnormal high frequency signal values 813, 823 and 815 in step S30.

In step S40, the geomagnetic signal processing apparatus 10 may determine whether the sum of the first abnormal high frequency signal value and the second abnormal high frequency signal value has a value within a predetermined critical range.

For example, referring to the high frequency signal 803, the geomagnetic signal processing apparatus 10 may determine whether the sum of the abnormal high frequency signal value 813 and the abnormal high frequency signal value 823 has a value within a predetermined critical range. As a result of the determination, when the sum has a value within the predetermined critical range, the geomagnetic signal processing apparatus 10 may determine the abnormal high frequency signal value 813 and the abnormal high frequency signal value 823 as noise.

On the other hand, when the sum has a value outside the predetermined critical range, the geomagnetic signal processing apparatus 10 may determine the abnormal high frequency signal value 813 and the abnormal high frequency signal value 823 as offset.

In the case of the high frequency signal 804, it includes one abnormal high frequency signal value 815. In this case, in step S40, since the sum of the abnormal high frequency signal values is converged to the abnormal high frequency signal value 815, which is a value outside the critical range, the geomagnetic signal processing apparatus 10 may determine the abnormal high frequency signal value 815 as offset.

A process in which the geomagnetic signal processing apparatus 10 determines whether the abnormal high frequency signal value is noise or offset by determining whether the sum of the abnormal high frequency signal values converges has been described with reference to FIG. 8. According to the embodiment of the present disclosure, the geomagnetic signal processing apparatus 10 may determine, particularly, whether the sum of the abnormal high frequency signal values converges within a preset time window.

Figure 9:
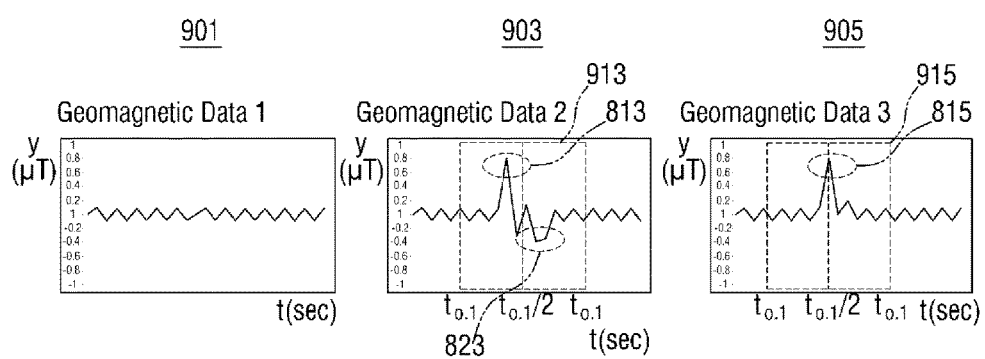
FIG. 9 illustrates an example of a time window according to some embodiments of the present disclosure.

FIG. 9 illustrates an example of a time window according to some embodiments of the present disclosure.

Referring to FIG. 9, a high frequency signal 901 for the geomagnetic data 1 does not have an abnormal high frequency signal value.

A high frequency signal 903 for the geomagnetic data 2 includes the abnormal high frequency signal value 813 and the abnormal high frequency signal value 823 as abnormal high frequency signal values outside a predetermined critical range.

A high frequency signal 905 for the geomagnetic data 3 includes the abnormal high frequency signal value 815 as an abnormal high frequency signal value outside the predetermined critical range.

Figure 10:
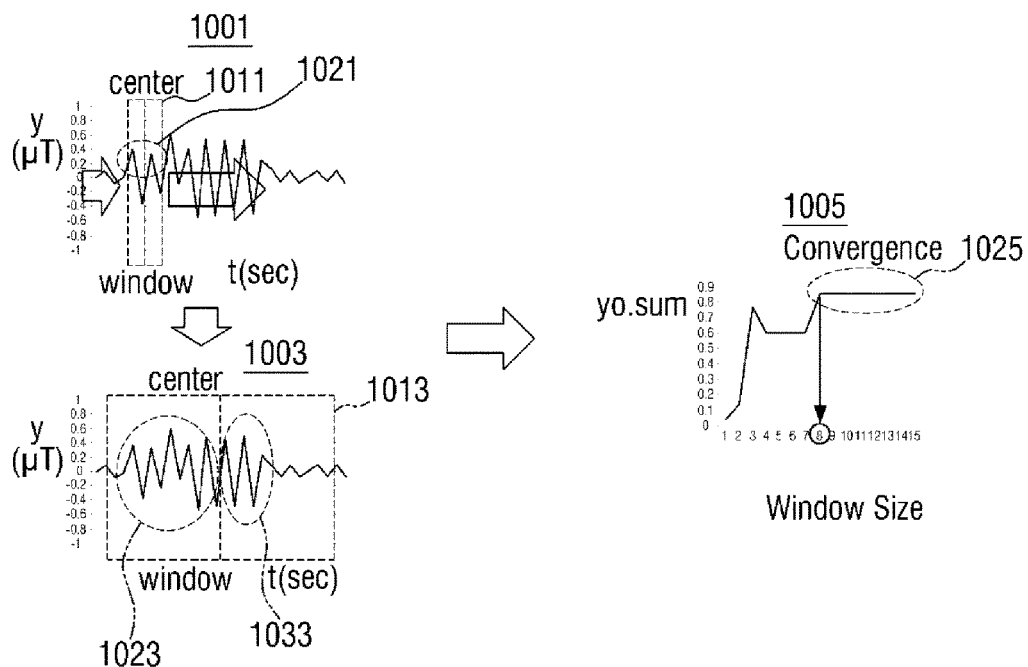
FIG. 10 is an exemplary diagram illustrating a method of setting a time window according to some embodiments of the present disclosure.

Referring to FIG. 10, the geomagnetic signal processing apparatus 10 may set a time window so as to have a magnitude 1 based on the abnormal high frequency signal value. In this case, a time window having a size from $-\frac{1}{2}$ to $+\frac{1}{2}$ may be set based on the time coordinates of the abnormal high frequency value. For the high frequency signal 905, a time window 915 has been set.

When there are a plurality of abnormal high frequency signal values, a time window having a size from $-\frac{1}{2}$ to $+\frac{1}{2}$ may be set based on the intermediate time coordinates of the abnormal high frequency signals. In the case of the high frequency signals 813 and 823, a time window 913 has been set.

The abnormal high frequency signal value may be defined by Eq. 4:

$$y_{0j} = y_i \text{ (when } y_i \geq y_{band.max} \text{ or } y_i \leq y_{band.min}, 0 \leq i \leq n, 0 \leq j \leq m) \qquad \text{Eq. 4}$$

where m is the number of abnormal high frequency signals.

In step S40, the geomagnetic signal processing apparatus 10 may calculate the sum of the abnormal high frequency signal values in a time window having a size of 1 by using Eq. 5:

$$y_{0.sum} = \sum_{i=y_{0.center}-l/2}^{y_{0.center}+l/2} y_{0i} \text{ where } y_{0.center} = \left[\sum_{j=1}^{m} y_{0j}\right]/m \qquad \text{Eq. 5}$$

The geomagnetic signal processing apparatus 10 may determine the abnormal high frequency signal value as offset when the sum of Eq. 5 is above (or greater than) the maximum value, or below (or less than) the minimum value of the predetermined critical range.

On the other hand, the geomagnetic signal processing apparatus 10 may determine the abnormal high frequency signal value as noise when the sum of Eq. 5 is less than (or below) the maximum value and is greater than (or above) the minimum value of the predetermined critical range.

In another embodiment of the present disclosure, when the high frequency signal includes a combination of noise and offset within a preset time window, in step S40, the geomagnetic signal processing apparatus 10 may determine, as offset, both the first abnormal high frequency signal value indicating noise and the second abnormal high frequency signal value indicating offset within a preset time window.

In this case, in step S55, the geomagnetic signal processing apparatus 10 may determine an offset value for each offset and correct each of the abnormal high frequency signal values by the determined offset value.

Specifically, the geomagnetic signal processing apparatus 10 may determine a first offset value based on a normal signal value corresponding to a normal high frequency signal value of the acquired geomagnetic signal and a first abnormal signal value corresponding to the first abnormal high frequency signal value.

For example, referring to the high frequency signal 905, the offset value may be determined based on a difference between a high frequency signal value immediately before the abnormal high frequency signal value 815 and the abnormal high frequency signal value 815 in the time window 915. The geomagnetic signal processing apparatus 10 may correct the abnormal signal value 815 by the determined offset value.

In the same manner, the geomagnetic signal processing apparatus 10 may determine a second offset value based on a normal signal value corresponding to a normal high frequency signal value of the acquired geomagnetic signal and a second abnormal signal value corresponding to the second abnormal high frequency signal value.

The geomagnetic signal processing apparatus 10 may correct the second abnormal signal value by the determined second offset value.

According to another embodiment of the present disclosure, the geomagnetic signal processing apparatus 10 may set a time window. Hereinafter, a method of setting a time window will be described in detail with reference to FIG. 10.

FIG. 10 is an exemplary diagram illustrating a method of setting a time window according to some embodiments of the present disclosure.

Referring to FIG. 10, the geomagnetic signal processing apparatus 10 may set the time window to a first size.

Referring to a high frequency signal 1001, the geomagnetic signal processing apparatus 10 may set a time window 1011 of a first size. For example, the first size may be a minimum size unit of a time window, and may be one second in time coordinates.

The geomagnetic signal processing apparatus 10 may determine whether an abnormal high frequency signal value is included in the time window of the first size.

Referring to a high frequency signal 1001, the time window 1011 includes an abnormal high frequency signal value 1021 of the high frequency signal 1001. However, it does not include other abnormal high frequency signal values near the abnormal high frequency signal value 1021.

The geomagnetic signal processing apparatus 10 may change the size of the time window 1011 according to the determination result. Specifically, the geomagnetic signal processing apparatus 10 may search for another abnormal high frequency signal value near the abnormal high frequency signal value 1021 while increasing the size of the time window. The geomagnetic signal processing apparatus 10 may determine whether there is another abnormal high frequency signal value while increasing the size of the time window by a preset upper limit time.

As a result of the search, when there is no other abnormal high frequency signal value, the geomagnetic signal processing apparatus 10 may determine the size of the time window to be that of the time window 1011.

Alternatively, when the sum of the high frequency signal values included in the time window converges to a predetermined high frequency signal value, the geomagnetic signal processing apparatus 10 may determine, as the size of the time window, the time at which the convergence of the sum starts.

A high frequency signal 1003 includes a plurality of abnormal high frequency signal values.

In this case, when the time window of the first size includes the first abnormal high frequency signal value but does not include the second abnormal high frequency signal value, the geomagnetic signal processing apparatus 10 may change the size of the time window from the first size to the second size including the first abnormal high frequency signal value and the second abnormal high frequency signal value.

Referring to the high frequency signal 1003, a time window 1013 includes a plurality of abnormal high frequency signal values 1023 and 1033 which are not included in the time window of the first size.

In this case, the geomagnetic signal processing apparatus 10 may calculate the sum of the first abnormal high frequency signal value 1023 and the second abnormal high frequency signal value 1033 in the time window of the second size. When the sum converges to a specific value for a predetermined time period, the geomagnetic signal processing apparatus 10 may set the time window to the second size.

Referring to graph 1005, for example, when the time when the sum of the abnormal high frequency signal values starts to converge is 8 seconds, the geomagnetic signal processing apparatus 10 may set the time window to a size of 8 seconds.

Thereafter, the geomagnetic signal processing apparatus 10 may determine whether the converged specific value is within or outside a predetermined critical range, and finally determine whether the abnormal high frequency signal value is noise or offset.

Figure 11:
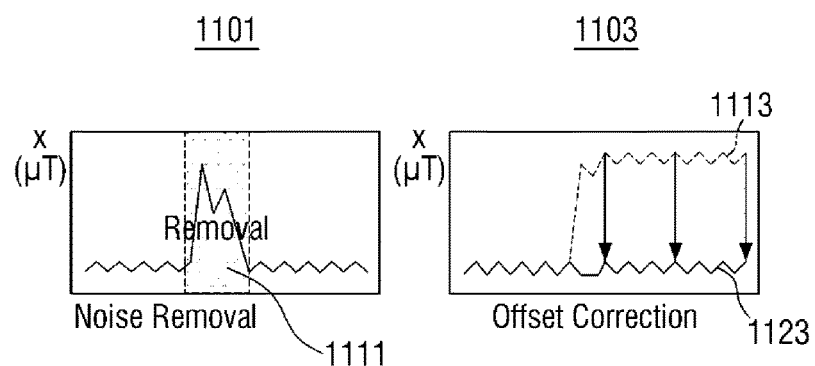
FIG. 11 illustrates the correction result for a geomagnetic signal according to some embodiments of the present disclosure.

FIG. 11 illustrates the correction result for a geomagnetic signal according to some embodiments of the present disclosure.

In step S50, when the abnormal high frequency signal value is determined as noise, the geomagnetic signal processing apparatus 10 may remove a signal region corresponding to the abnormal high frequency signal value from the acquired geomagnetic signal.

Referring to a geomagnetic signal 1101, a case where a noise region 1111 corresponding to the abnormal high frequency signal value is removed is illustrated as an example.

In step S55, when the abnormal high frequency signal value is determined as offset, the geomagnetic signal processing apparatus 10 may determine an offset value on the basis of a normal signal value corresponding to a normal high frequency signal value of the acquired geomagnetic signal and an abnormal signal value corresponding to an abnormal high frequency signal value.

Referring to a geomagnetic signal 1103, the offset value may be determined by a difference between offset 1113 and a normal signal value 1123 immediately before the offset occurs.

The geomagnetic signal processing apparatus 10 may correct an abnormal signal value by the determined offset value. Accordingly, the geomagnetic signal value can be maintained at the normal signal value 1123 even after the offset occurs.

Thus, the geomagnetic signal processing apparatus 10 can measure an accurate geomagnetic signal value, and the accuracy in positioning using the geomagnetic sensor can also be improved as in the system described with reference to FIG. 1.

The embodiments of the present disclosure described above with reference to FIGS. 3 to 11 can be implemented in computer readable code on a computer readable medium. The computer readable recording medium may be, for example, a removable recording medium such as a CD, a DVD, a Blu-ray disc, a USB storage device and a removable hard disk, or a fixed recording medium such as an ROM, an RAM and a computer-equipped hard disk. The computer program recorded on the computer-readable recording medium may be transmitted to another computing device via a network such as the Internet and installed in the computing device, and thus can be used in the computing device.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for performing geomagnetic signal processing using a geomagnetic signal processing apparatus, the method comprising:
    obtaining a geomagnetic signal based on a geomagnetic sensor output;
    converting the obtained geomagnetic signal into a high frequency signal having a frequency equal to or higher than a reference frequency using a signal processing filter;
    extracting abnormal high frequency signal values outside a critical range from the converted high frequency signal;
    determining whether a sum of the extracted abnormal high frequency signal values converges into the critical range within a preset time window;
    correcting the geomagnetic signal based on the determining;
    setting a time window to a first size;
    determining whether the extracted abnormal high frequency signal values are included in the time window of the first size; and
    changing a size of the time window according to the determining whether the extracted abnormal high frequency signal values are included in the time window of the first size,
    wherein the determining whether the sum of the extracted abnormal high frequency signal values converges into the critical range within the preset time window comprises:
        determining the extracted abnormal high frequency signal values as noise when the sum of the extracted abnormal high frequency signal values converges into the critical range within the preset time window; and
        determining the extracted abnormal high frequency signal values as offset when the sum of the extracted abnormal high frequency signal values does not converge into the critical range within the preset time window, and
    wherein a first abnormal high frequency signal value is equal to or greater than a maximum value of the critical range and a second abnormal high frequency signal value is equal to or less than a minimum value of the critical range.

2. The method of claim 1, wherein the correcting the geomagnetic signal comprises:
    removing a signal region corresponding to the extracted abnormal high frequency signal values from the geomagnetic signal when the extracted abnormal high frequency signal values are determined as noise.

3. The method of claim 1, wherein the correcting the geomagnetic signal comprises:
    determining an offset value based on a normal signal value corresponding to a normal high frequency signal value of the geomagnetic signal and an abnormal signal value corresponding to the extracted abnormal high frequency signal values when the extracted abnormal high frequency signal values are determined as offset; and
    correcting the abnormal signal value by the determined offset value.

4. The method of claim 1, further comprising determining the reference frequency based on a predetermined velocity and a distance between a first point and a second point at which geomagnetic values are different from each other in a reference geomagnetic signal of a positioning target area.

5. The method of claim 1, wherein the signal processing filter is a filter to which a weight determined based on the reference frequency has been applied.

6. The method of claim 1, wherein the critical range includes a maximum high frequency signal value and a minimum high frequency signal value of a second high frequency signal corresponding to a reference geomagnetic signal of a positioning target area.

7. The method of claim 1, wherein the changing the size of the time window comprises:
    changing the size of the time window from the first size to a second size including the first abnormal high frequency signal value and the second abnormal high frequency signal value when the time window of the first size includes the first abnormal high frequency signal value and does not include the second abnormal high frequency signal value.

8. The method of claim 1, wherein the changing the size of the time window from the first size to a second size including the first abnormal high frequency signal value and the second abnormal high frequency signal value comprises:
    calculating the sum of the first abnormal high frequency signal value and the second abnormal high frequency signal value within a time window of the second size; and
    setting the time window to the second size if the sum converges to a specific value for a predetermined time period.

9. The method of claim 1, wherein the correcting the geomagnetic signal comprises:
    comparing the corrected geomagnetic signal with a reference geomagnetic signal of a positioning target area; and
    determining a position of the geomagnetic sensor as a result of the comparing.

10. The method of claim 1, wherein the correcting the geomagnetic signal comprises:
    transmitting the corrected geomagnetic signal to a positioning server; and receiving a positioning result determined by comparing the corrected geomagnetic signal with a reference geomagnetic signal of a positioning target area from the positioning server.

11. A non-transitory computer readable recording medium having embodied thereon a program, which when executed by a processor of a device causes the device to execute a method, the method including:
obtaining a geomagnetic signal based on a geomagnetic sensor output;
converting the obtained geomagnetic signal into a high frequency signal having a frequency equal to or higher than a reference frequency using a signal processing filter;
extracting abnormal high frequency signal values outside a critical range from the converted high frequency signal;
determining whether a sum of the extracted abnormal high frequency signal values converges into the critical range within a preset time window;
correcting the geomagnetic signal based on the determining;
setting a time window to a first size;
determining whether the extracted abnormal high frequency signal values are included in the time window of the first size; and
changing a size of the time window according to the determining whether the extracted abnormal high frequency signal values are included in the time window of the first size,
wherein the determining whether the sum of the extracted abnormal high frequency signal values converges into the critical range within the preset time window comprises:
determining the extracted abnormal high frequency signal values as noise when the sum of the extracted abnormal high frequency signal values converges into the critical range within the preset time window; and
determining the extracted abnormal high frequency signal values as offset when the sum of the extracted abnormal high frequency signal values does not converge into the critical range within the preset time window, and
wherein a first abnormal high frequency signal value is equal to or greater than a maximum value of the critical range and a second abnormal high frequency signal value is equal to or less than a minimum value of the critical range.

12. A mobile device comprising:
a geomagnetic sensor configured to generate a geomagnetic signal; and
a controller configured to:
convert the geomagnetic signal into a high frequency signal having a frequency equal to or higher than a reference frequency using a signal processing filter;
extract abnormal high frequency signal values outside a critical range from the high frequency signal;
correct the geomagnetic signal based on whether a sum of the abnormal high frequency signal values is within the critical range within a preset time window
set a time window to a first size;
determine whether the extracted abnormal high frequency signal values are included in the time window of the first size; and
change a size of the time window according to whether the extracted abnormal high frequency signal values are included in the time window of the first size,
wherein the controller is further configured to determine whether the sum of the extracted abnormal high frequency signal values converges into the critical range within the preset time window by:
determining the extracted abnormal high frequency signal values as noise when the sum of the extracted abnormal high frequency signal values converges into the critical range within the preset time window; and
determining the extracted abnormal high frequency signal values as offset when the sum of the extracted abnormal high frequency signal values does not converge into the critical range within the preset time window, and
wherein a first abnormal high frequency signal value is equal to or greater than a maximum value of the critical range and a second abnormal high frequency signal value is equal to or less than a minimum value of the critical range.

13. The mobile device of claim 12, wherein the controller is further configured to:
determine an offset value based on a normal signal value corresponding to a normal high frequency signal value of the geomagnetic signal and an abnormal signal value corresponding to the abnormal high frequency signal values when the extracted abnormal high frequency signal values are determined as offset; and
correct the abnormal signal value by the offset value.

14. The mobile device of claim 12, wherein the controller is further configured to:
determine the reference frequency based on a predetermined velocity and a distance between a first point and a second point at which geomagnetic values are different from each other in a reference geomagnetic signal of a positioning target area.

15. The mobile device of claim 12, wherein a weight determined based on the reference frequency has been applied to the signal processing filter.

16. The mobile device of claim 12, wherein the critical range includes a maximum high frequency signal value and a minimum high frequency signal value of a second high frequency signal corresponding to a reference geomagnetic signal of a positioning target area.

* * * * *